UNITED STATES PATENT OFFICE.

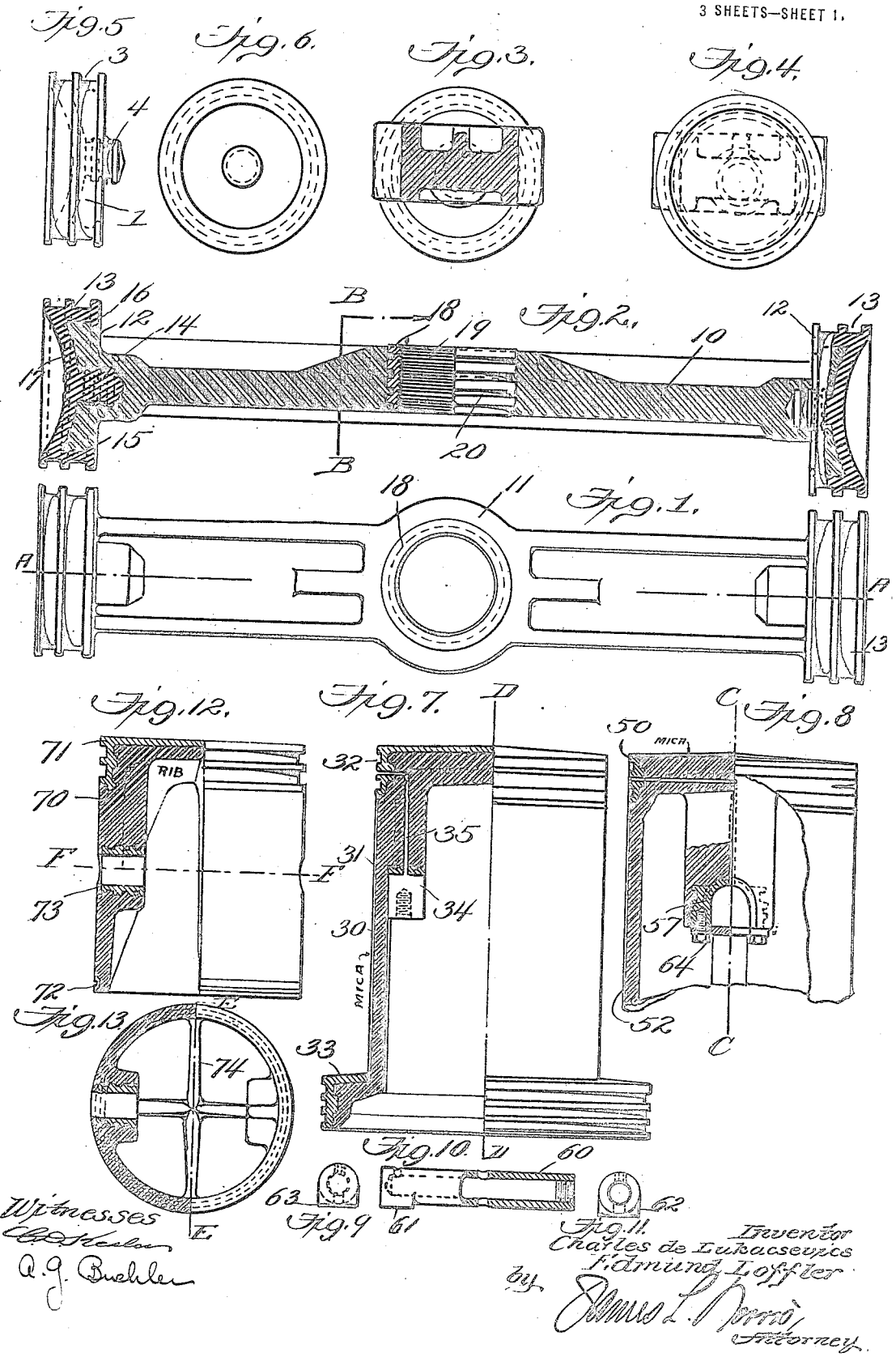

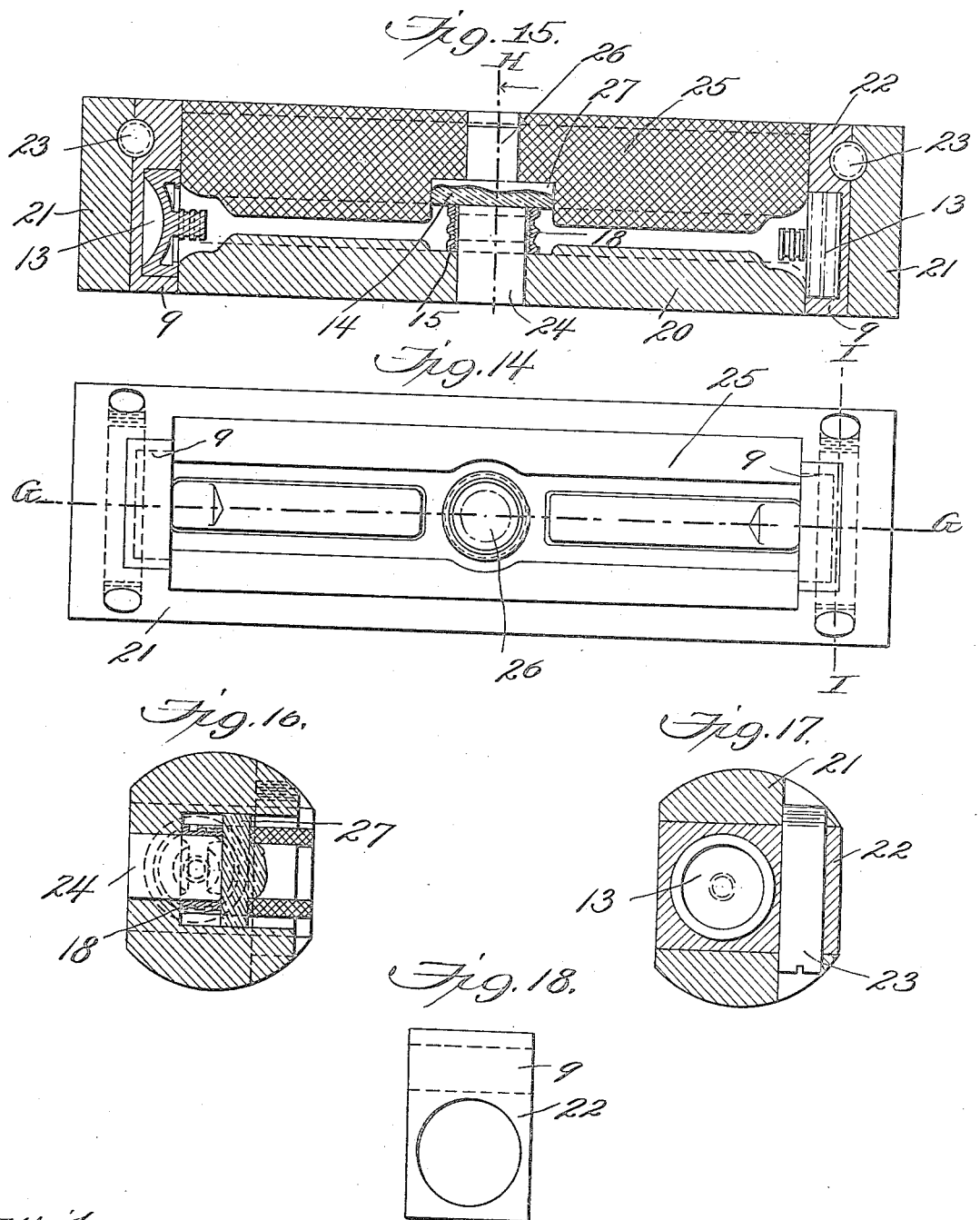

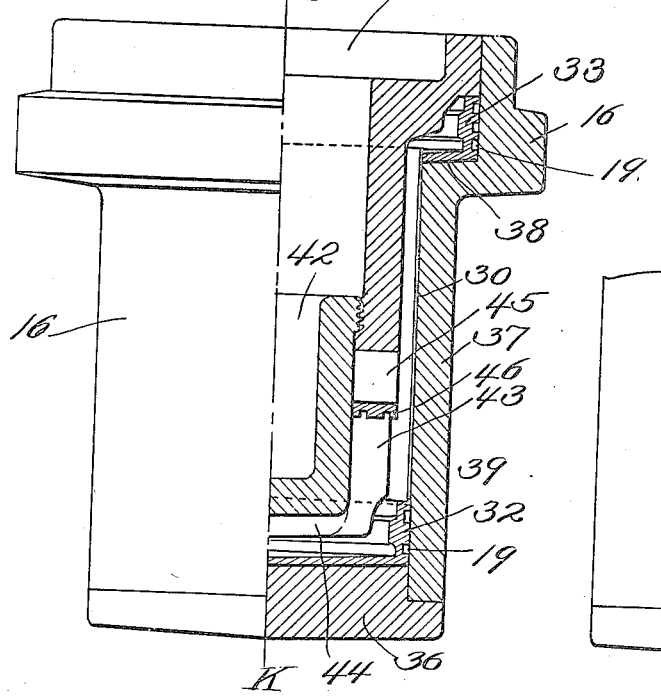
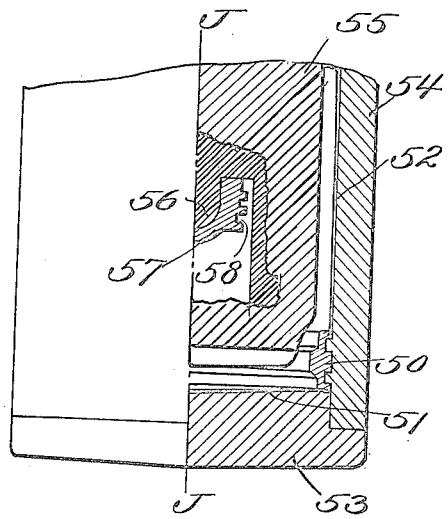
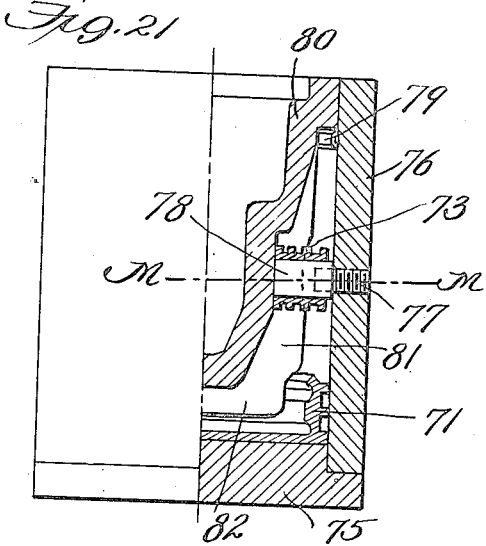
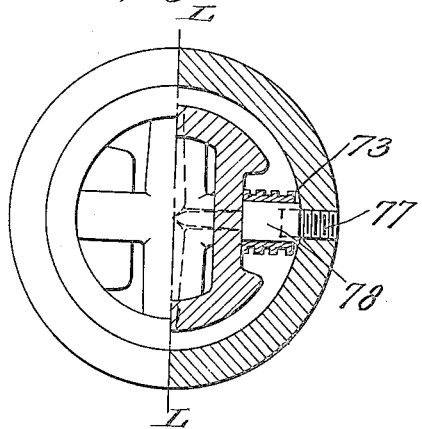

CHARLES DE LUKACSEVICS AND EDMUND LOFFLER, OF NEW YORK, N. Y.

ENGINE PISTON.

1,407,667.   Specification of Letters Patent.   Patented Feb. 21, 1922.

Application filed April 30, 1920. Serial No. 377,939.

*To all whom it may concern:*

Be it known that we, CHARLES DE LUKACSEVICS and EDMUND LOFFLER, citizens of the United States, residing at New York, in the county of New York and State of New York, have invented new and useful Improvements in Engine Pistons, of which the following is a specification.

Our invention relates to novel and improved piston construction which utilizes phenol condensation products for the body portion of the piston.

With metal pistons such as cast-iron and aluminium difficulty has been experienced because of the internal strains set up in the metal during the heating and the cooling of the same in the casting operation. These frequently lead to distortion of the piston after it has been finally machined. It has been found, however, that pistons formed of the above mentioned material cast to cylindrical shape will follow the conditions internally existing in the cylinders without cracking. Furthermore, metal inserts are used in connection with the body of the piston for holding the piston rings and wrist pins, the former being preferably of the same material as the cylinders of the engine so as to harmonize with the cylinder in the expansion and contraction due to the heat within the cylinder.

It has also been found advantageous to use mica in conjunction with the walls of some pistons, for the purpose of utilizing the lubricating properties of mica in the reciprocation of the pistons as well as its heat insulating qualities.

In the following specification reference is made to the accompanying drawings, in which:

Figure 1 is a plan elevation of pistons and connecting rod adapted to be used in engines of the type utilizing oppositely disposed cylinders.

Figure 2 is a section on the line A—A of Figure 1.

Figure 3 is a transverse sectional view on the line B—B of Figure 2.

Figure 4 is an end elevation of the piston.

Figure 5 is a side view of the piston head insert.

Figure 6 is an end view of the same.

Figure 7 is a partial side elevation and sectional view of a stepped piston, the section being taken on the line C—C of Figure 8.

Figure 8 is a part elevation and part sectional view on the line D—D of Figure 1, but showing a slightly modified construction.

Figures 9, 10 and 11 are details of a wrist pin used in connection with the form of piston illustrated in Figure 7.

Figure 12 is an elevation and part sectional view of the ordinary type of cylindrical piston, section being taken on the line E—E of Figure 13.

Figure 13 is a partial plan view and section on line F—F of Figure 12.

Figure 14 is a plan view of our improved die construction for making the pistons and connecting rod illustrated in Figure 2.

Figure 15 is a sectional view of the die illustrated in Figure 14, taken on the line G—G.

Figure 16 is a transverse sectional view taken on the line H—H of Figure 15, looking in the direction of the arrows.

Figure 17 is a sectional view on the line I—I of Figure 14.

Figure 18 is an elevation showing the piston head insert adapter, that is slidably mounted in the die.

Figure 19 a part elevation and sectional view of the die for making the stepped form of piston illustrated in Figure 7, section being taken on the line J—J of Figure 20.

Figure 20 is a partial elevation and sectional view on the line K—K of Figure 19.

Figure 21 is a part elevation and sectional view of the die for forming pistons similar to that illustrated in Figure 12, the section being taken on the line L—L of Figure 22.

Figure 22 is a part plan view and section of the die shown in Figure 21, section being taken on the line M—M of Figure 21.

The pistons illustrated in Figures 1 and 2 are of the type utilized in our copending application for internal combustion engine, Serial No. 377,986, filed April 30, 1920, but it will be understood that this type of piston is of general application to engines employing oppositely disposed cylinders rigidly connected to a connecting rod, so that the entire structure may be referred to as a piston construction. The piston construction comprises a body portion 10 of a phenol condensation product ordinarily termed the connecting rod, which is preferably of the shape illustrated in Figure 2, having a centrally apertured boss 11 and the enlarged portions 12 at each end. Cast iron heads 13 are inserted over the heads 12 and are held in place on the heads of the connecting rods by means of the groove stem portions 14, and the peripheral groove 15 of the head 12 which is adapted to receive a flange 16 projecting from the lower end of each piston head. The cast iron inserts are also provided with concaved heads which are correspondingly convex on the inner sides so as to co-operate with the stems and flanges for holding the piston head inserts firmly, and embedding the same in the heads 12. The central aperture of the boss 11 is provided with a metal insert 18 which is threaded internally at 19 for receiving the driving means for the crank shaft, and grooved externally at 20 for firmly gripping the material composing connecting rod 10.

Referring now to Figures 15 to 18 which illustrate the die by which this piston construction is made it will be seen that this die comprises a base member 20 of an interior contour conforming with the lower surface of the connecting rod and grooved side members 21 adapted to slidably receive adapters 22, having recesses therein for receiving the piston head inserts 13, and when in position holding said inserts in correct alignment in relation to the other portions of the die. The side walls 21 and adapters 22 are provided with arcuate recesses for receiving a retaining pin 23 when said recesses are in correct alignment, and thereby locking the piston head inserts in correct position. The threaded central insert 18 is held in position within the die by means of a cylindrical plunger 24 inserted through a central opening in the base 20. The compression or male members 25 of the die is adapted to be slidably received between the adapters 22 and its lower surface is of such contour as to shape the phenol condensation material within the die to the desired final configuration. In the center this compression member is provided with a plug 26 having an enlarged portion 27 for finishing the central boss of the connecting rod in which the metal 18 is inserted. The plunger 24 serves to lock the insert 18 as specified above, and also acts as a knockout pin for removing the finished piston from the die after the compression member 25 and the retaining pins 23 are removed.

In operation cast iron inserts 13 are placed within the adapters 22 which are then allowed to slide within the side members 21 until located in correct position when they are anchored by means of the retaining pins 23. This is followed by placing the metal insert 18 about the pin 24. The phenol condensation material in plastic condition is then poured within the mold and the compression member 25 lowered to apply force thereto. During this compression operation the die is preferably heated and pressure is applied for some time during which the die is also chilled. After this operation the piston rod in final form may be removed from the die by pressing on the plunger 24.

The stepped piston shown in Figure 7 is composed of the body 30 of a phenol condensation product, having mica inserts 31 about the side walls, piston head and ring inserts 32 and 33 on each piston head and wrist pin inserts 34. An oil duct 35 leads from the top of the wrist pin to the side wall of the piston through the piston ring insert 32, and is preferably drilled after the casting operations have been completed. In making this type of piston the die shown in Figures 19 and 20 is employed. This die consists of the base portion 36 and the removable body portion 37 which is enlarged at the top above the shoulder 38 that is adapted to receive the piston head and ring insert 33 of the large piston head. The piston ring insert 32 of the smaller piston head rests on the bottom plate 36 within the cylindrical portion 37. Each of the piston ring inserts is provided with grooves about the interior cylindrical surface for the purpose of anchoring the inserts on the body. Mica sheet 30 is placed in contact with the interior wall of the cylindrical portion 37 and the upper portion of the mica extends slightly beyond the top of the cast iron insert 36, and the bottom engages in a groove 39 formed along the edge of the piston ring insert 32.

The compression or male member of the die (Figs. 19, 20) is made of a part 41 of large diameter for forming the large piston head and the body portion up to the wrist pin retainer, and a part 42 of smaller diameter for forming the smaller interior portion of the piston. The part 42 is slotted at 43, 44 in order to form ribs of bakelite on the finished piston. The compression member 42 carries a pin 45 over which the metal wrist pin retaining insert is placed, the diameter of the pin being slightly larger than the interior dimension of the insert so that the latter will yieldingly maintain itself on the pin. The contacting surface of the insert 46 is grooved and provided with an adhesive substance such as glue so that it may be attached and anchored to the phenol condensation material.

It is evident that the phenol condensation material placed within the die will assume the desired shape when a compression force is applied to the male member and that as the material hardens the metal inserts 32, 33, 46 and the mica side sheets will be firmly embedded within the body.

The die shown in Fig. 20 is employed in making the piston shown in Fig. 8 in which mica sheets are used on the piston head and side walls. The piston ring insert 50 is a ring formed on its upper edge with a recess for receiving the edge of the top mica insert 51, and on its lower edge with a recess for receiving the upper portion of the side mica insert 52. The die comprises the base 53, cylindrical side walls 54 and the compression or male member 55 having a rounded boss 56 for frictionally holding the wrist pin retainer insert 57 which is grooved at 58 in order to effectively engage the bakelite. The top mica sheet 51 is first placed within the die and contacts with the base 53. The piston ring insert 50 is placed in position and then the mica side walls 52 are placed against the cylindrical side walls and located in the appropriate recess of the piston ring insert. A phenol condensation product in plastic condition is placed within the die and the male member 55 is forced downward while the die is heated and subsequently chilled when the pressure may be relieved, the compression member 55 withdrawn and the cast piston removed.

Figures 9, 10 and 11 illustrate the type of wrist pin 60 employed with the pistons illustrated in Figures 7 and 8. It will be noted that the same is bored for the transmission of lubricant and that one end is closed by the integral head 61 and the other end by the detachable head 62. Each head is provided with a flattened portion 63 for engaging straps 64 which retain the wrist pin against rotation.

Figures 12 and 13 illustrate the common type of cylindrical piston which according to my invention is made of a body portion 70 of phenol condensation material having a cast iron head and piston ring insert 71, lower piston ring insert 72 and wrist pin insert 73. The piston is formed interiorly with the reenforcing ribs 74 which intersect beneath the piston head, extend the full width and thickness of the wrist pin inserts and taper gradually to the lower end of the piston.

The die for making the piston 70 is illustrated in Figures 21 and 22 in which 75 is the base member having an annular recess for receiving the cylindrical side walls 76. The latter are provided at opposite sides with threaded apertures for receiving the threaded extension 77 of a retaining pin 78 for the cylindrical wrist pin retainer insert 73. The lower piston ring retainer 72 is maintained in place within the die by a slight annular rib adapted to engage in the groove of the retainer. With the upper piston ring and head 71 in place in the die as shown in Fig. 21 the wrist pin retainer 73 and lower piston ring also positioned as illustrated in that figure, the plastic material may be placed in the die and the compression member 80 moved inwards to force the material into the open places of the die. These open places include the longitudinal and transverse recesses 81, 82 in the compression member which form the reenforcing ribs 74. After the material has hardened the compression member 80 and retainer 78 are removed, and base 75 displaced, when the case piston may be readily forced over the rib 79 and out of the bottom of the die.

Phenol condensation substances used in piston constructions permit contraction and expansion of the metal inserts without cracking, and thus harmonize with the conditions which exist within the cylinder. Pistons may be economically manufactured in accordance with our invention since costly machining and grinding operations necessary with metal pistons are eliminated and, furthermore, a piston giving efficiency in operation is obtained.

In the claims:

1. A piston having a body portion composed of a phenol condensation product, and a metallic piston head having a stem provided with grooves for firmly embedding the metallic piston head in said condensation material while the latter is in a plastic state.

2. A piston having a body portion composed of a phenol condensation product and a metallic piston head firmly embedded in said condensation product while the latter is in a plastic state.

3. A piston having a body portion composed of a phenol condensation product, a metallic piston head embedded in each end of said body and an interiorly threaded metallic insert embedded in an intermediate portion of said body.

In testimony whereof we have hereunto set our hands in presence of two subscribing witnesses.

CHARLES DE LUKACSEVICS.
  EDMUND LOFFLER.

Witnesses:
  HARRIET ROBINSON,
  JOHN WARD.